(12) United States Patent
Son et al.

(10) Patent No.: US 10,502,990 B2
(45) Date of Patent: Dec. 10, 2019

(54) LIQUID CRYSTAL DISPLAY COMPRISING FIRST, SECOND, AND THIRD PIXELS HAVING DRIVING VOLTAGES FOR MAXIMUM TRANSMITTANCES THAT ARE DIFFERENT FROM EACH OTHER

(71) Applicant: Samsung Display Co., Ltd., Yongin-si (KR)

(72) Inventors: Jong Ho Son, Seoul (KR); Keun Chan Oh, Cheonan-si (KR); Min-Hee Kim, Ansan-si (KR); Kyung Seon Tak, Hwaseong-si (KR); Joon-Hyung Park, Seoul (KR); Kang Seob Jeong, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 727 days.

(21) Appl. No.: 15/008,050

(22) Filed: Jan. 27, 2016

(65) Prior Publication Data

US 2016/0370634 A1    Dec. 22, 2016

(30) Foreign Application Priority Data

Jun. 22, 2015    (KR) ........................ 10-2015-0088364

(51) Int. Cl.
*G02F 1/133*    (2006.01)
*G02F 1/13357*    (2006.01)
(Continued)

(52) U.S. Cl.
CPC ........ *G02F 1/13306* (2013.01); *G02F 1/1336* (2013.01); *G02F 1/133621* (2013.01);
(Continued)

(58) Field of Classification Search
CPC ... G02F 1/133621; G02F 2001/133624; G02F 1/01; G09G 2300/0866
See application file for complete search history.

(56) References Cited

U.S. PATENT DOCUMENTS 4,929,061 A * 5/1990 Tominaga ............ G09G 3/3607
349/106
9,153,185 B2    10/2015 Yoo et al.
(Continued)

FOREIGN PATENT DOCUMENTS

JP    2006196374 A *  7/2006  ....... G02F 1/133504
JP    2007079565 A *  3/2007  ....... G02F 1/133617
(Continued)

*Primary Examiner* — Paul C Lee
(74) *Attorney, Agent, or Firm* — H.C. Park & Associates, PLC

(57) ABSTRACT

A liquid crystal display (LCD) includes: a first pixel configured to emit first light having a first wavelength; a second pixel configured to emit second light having a second wavelength longer than the first wavelength; a third pixel configured to emit third light having a third wavelength longer than the second wavelength; and a liquid crystal (LC) panel in which driving voltages for maximum transmittances for the first light, the second light, and the third light are different from each other. The LCD is configured to apply different voltages to pixel electrodes of the first pixel, the second pixel, and the third pixel, respectively, such that the first light, the second light, and the third light respectively emitted by the first pixel, the second pixel, and the third pixel are transmitted at the respective maximum transmittances.

13 Claims, 5 Drawing Sheets

(51) Int. Cl.
  *G02F 1/1335*  (2006.01)
  *G09G 3/34*  (2006.01)
  *G09G 3/36*  (2006.01)

(52) U.S. Cl.
  CPC ......... *G09G 3/3413* (2013.01); *G09G 3/3611*
    (2013.01); *G02F 2001/133624* (2013.01);
    *G09G 2300/0866* (2013.01)

(56) References Cited

U.S. PATENT DOCUMENTS

| | | |
|---|---|---|
| 2002/0097395 A1 | 7/2002 | Smith et al. |
| 2006/0125749 A1* | 6/2006 | Lee ................. G09G 3/3648 345/88 |
| 2006/0239336 A1 | 10/2006 | Baraniuk et al. |
| 2008/0129929 A1* | 6/2008 | Miyachi ................. C09K 19/02 349/89 |
| 2011/0248941 A1 | 10/2011 | Abdo et al. |
| 2012/0032999 A1 | 2/2012 | Seetzen |
| 2012/0218315 A1 | 8/2012 | Hsiao et al. |
| 2012/0327326 A1 | 12/2012 | Suh et al. |

FOREIGN PATENT DOCUMENTS

| | | | |
|---|---|---|---|
| JP | 2007178902 A * | 7/2007 | ....... G02F 1/133617 |
| KR | 1020040017717 | 2/2004 | |
| KR | 1020060067290 | 6/2006 | |
| KR | 1020120060540 | 6/2012 | |

\* cited by examiner

LIQUID CRYSTAL DISPLAY COMPRISING FIRST, SECOND, AND THIRD PIXELS HAVING DRIVING VOLTAGES FOR MAXIMUM TRANSMITTANCES THAT ARE DIFFERENT FROM EACH OTHER

CROSS-REFERENCE TO RELATED APPLICATION

This application claims priority from and the benefit of Korean Patent Application No. 10-2015-0088364, filed on Jun. 22, 2015, which is hereby incorporated by reference for all purposes as if fully set forth herein.

BACKGROUND

Field

The technology described herein relates generally to a liquid crystal display (LCD), and more particularly, to an LCD including a plurality of pixels displaying a color image.

Discussion of the Background

A typical liquid crystal display (LCD) includes a pixel electrode, a common electrode, a liquid crystal (LC) layer including liquid crystal molecules configured to be tilted by an electric field that is generated by the pixel and common electrodes, and a backlight unit configured to emit light to the LC layer.

Such an LCD device displays a desired image by controlling intensity of the electric field generated by the pixel and common electrodes and then adjusting the transmittance of light that is emitted from the backlight unit to be transmitted through the LC layer.

The LC layer included in the LCD may have a phase delay characteristic that is intrinsic to the liquid crystals themselves, and accordingly, in the LCD, maximum transmittance of light transmitted through the LC layer has a characteristic according to each wavelength.

The above information disclosed in this Background section is only to enhancement of understanding of the background of the inventive concept, and, therefore, it may contain information that does not form the prior art that is already known to a person of ordinary skill in the art.

SUMMARY

Exemplary embodiments provide a liquid crystal display (LCD) configured to display an image with improved overall luminance by allowing light according to each wavelength to be transmitted through a liquid crystal (LC) layer at their maximum transmittances.

Additional aspects will be set forth in the detailed description which follows, and, in part, will be apparent from the disclosure, or may be learned by practice of the inventive concept.

An exemplary embodiment discloses a liquid crystal display (LCD) including: a first pixel configured to emit first light having a first wavelength; a second pixel configured to emit second light having a second wavelength longer than the first wavelength; a third pixel configured to emit third light having a third wavelength longer than the second wavelength; and a liquid crystal (LC) panel in which driving voltages for maximum transmittances for the first light, the second light, and the third light are different from each other. The LCD is configured to apply different voltages to pixel electrodes of the first pixel, the second pixel, and the third pixel, respectively, such that the first light, the second light, and the third light respectively emitted by the first pixel, the second pixel, and the third pixel are transmitted at the respective maximum transmittances.

An exemplary embodiment also discloses a liquid crystal display (LCD) including: a first pixel configured to emit first light having a first wavelength; a second pixel configured to emit second light having a second wavelength longer than the first wavelength; a third pixel configured to emit third light having a third wavelength longer than the second wavelength; a liquid crystal (LC) panel in which maximum transmittances for the first light, the second light, and the third light are different from each other; and a backlight unit configured to provide backlight to the LC panel. Intensity of the first wavelength of the backlight provided by the backlight unit is higher than intensity of the first wavelength in a white backlight.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
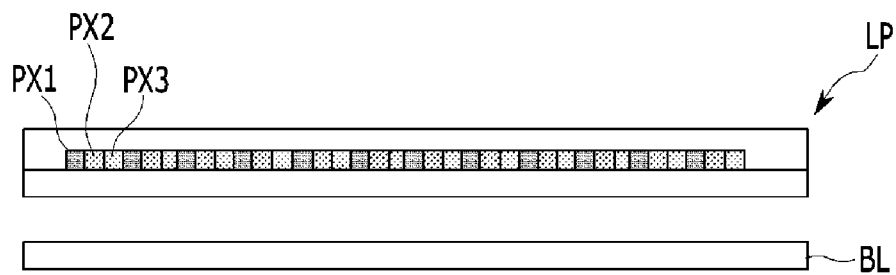
FIG. 1 is a schematic cross-sectional view of a liquid crystal display (LCD) according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. As such, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a schematic cross-sectional view of an LCD according to an exemplary embodiment.

As shown in FIG. 1, the LCD according to an exemplary embodiment includes a liquid crystal panel LP and a backlight unit BL.

The liquid crystal panel LP includes a liquid crystal (LC) layer, and a pixel electrode and a common electrode that generate an electric field in the LC layer. A common voltage may be applied to the common electrode, and the pixel electrode may be connected to one or more thin film transistors (not shown). One or more capacitors and a plurality of wires including one or more scan lines and one or more data lines may be connected to the one or more thin film transistors. The LC layer may be tilted in accordance with a voltage applied to the pixel electrode, and transmittance of light transmitted through the LC layer may be adjusted in accordance with the voltage applied to the pixel electrode.

Each of the LC layer, the pixel electrode, the common electrode, the thin film transistor, the capacitor, and the plurality of wires that are described above may be formed of various disclosed materials and may have various disclosed structures.

The liquid crystal panel LP is disposed on the backlight unit BL, and includes a plurality of pixels that may be a minimum unit for displaying an image. The plurality of pixels may respectively include the LC layer, the pixel electrode, the common electrode, the thin film transistor, the capacitor, and the plurality of wires, and may respectively include different color filters to create a color image.

The plurality of pixels includes a first pixel, PX1, a second pixel PX2, and a third pixel PX3.

The first pixel PX1 is configured to emit first light having a first wavelength.

In this case, the first wavelength may be about 400 nm to about 530 nm, and the first light may be blue light.

The second pixel PX2 is configured to emit second light having a second wavelength that is longer than the first wavelength.

In this case, the second wavelength may be about 520 nm to about 570 nm, and the second light may be green light.

The third pixel PX3 is configured to emit third light having a third wavelength that is longer than the second wavelength.

In this case, the third wavelength may be about 560 nm to about 640 nm, and the third light may be red light.

Figure 2:
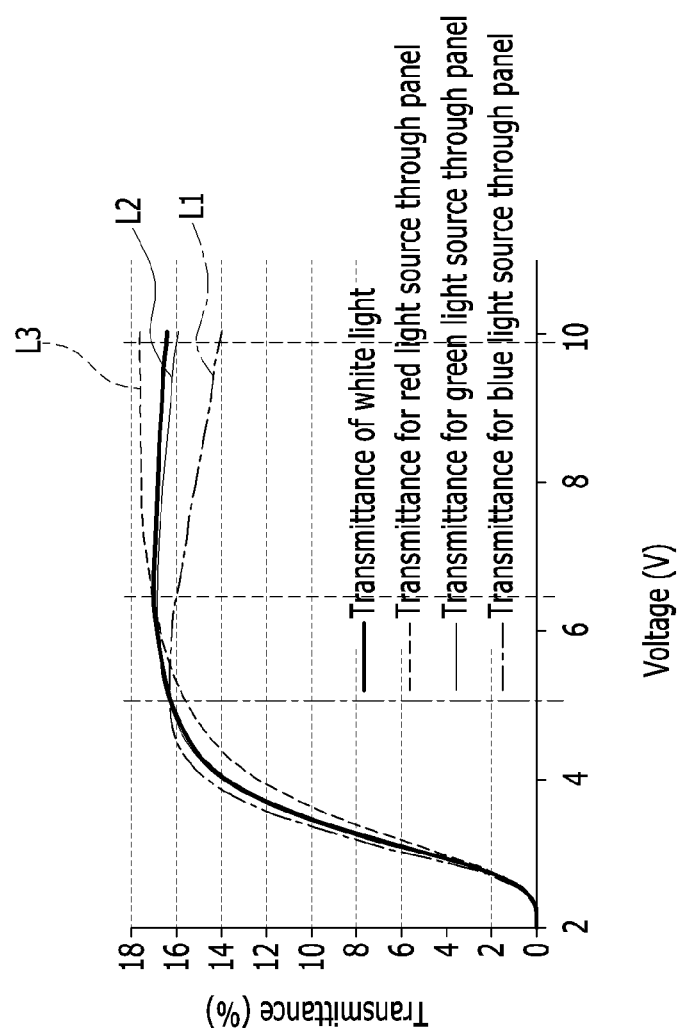
FIG. 2 is a graph showing transmittances of light according to each wavelength transmitted through a liquid crystal (LC) panel in the LCD of FIG. 1 according to an exemplary embodiment.

With reference to FIG. 2, in the LCD of FIG. 1, transmittances of light transmitted through the LC panel according to each wavelength will be described.

FIG. 2 is a graph showing transmittances of light transmitted through the LC panel according to each wavelength in the LCD of FIG. 1 according to an exemplary embodiment. In FIG. 2, an X-axis represents a voltage applied to the pixel electrode of the pixel, and a Y-axis represents transmittance of light that is transmitted through the LC panel.

As shown in FIG. 1 and FIG. 2, the first light L1 emitted by the first pixel PX1, the second light L2 emitted by the second pixel PX2, and the third light L3 emitted by the third pixel PX3, which are transmitted through the liquid crystal panel LP, have respectively different maximum transmittances due to a phase delay characteristic of the LC layer included in the liquid crystal panel LP, and the maximum transmittances for the first light L1, the second light L2, and the third light L3 may be respectively realized by the different voltages that are applied to the pixel electrode of each pixel.

More specifically, the liquid crystal panel LP has different maximum transmittances for the first light L1, the second light L2, and the third light L3, and the different voltages may be respectively applied to the pixel electrodes of the first, second, and third pixels PX1, PX2, and PX3 such that the first light L1, the second light L2, and the third light L3 respectively emitted by the first, second, and third pixels PX1, PX2, and PX3 are transmitted at their maximum transmittances.

For example, a voltage of about 4.5 V may be applied to the pixel electrode of the first pixel PX1 such that the first pixel PX1 emits the first light L1 to be transmitted at the maximum transmittance of about 16%, a voltage of about 6.5 V may be applied to the pixel electrode of the second pixel PX2 such that the second pixel PX2 emits the second light L2 to be transmitted at the maximum transmittance of about 17%, and a voltage of about 10 V may be applied to the pixel electrode of the third pixel PX3 such that the third pixel PX3 emits the third light L3 to be transmitted at the maximum transmittance of about 18%.

As such, in the liquid crystal panel LP, the maximum transmittance for the third light L3 may be greater than the maximum transmittance for the second light L2 and the maximum transmittance for first light L1, and the maximum transmittance for the second light L2 may be greater than the maximum transmittance for the first light L1.

In order to control the first light L1, the second light L2, and the third light L3 to be respectively transmitted through the liquid crystal panel LP at their maximum transmittances, the voltage applied to the pixel electrode of the third pixel PX3 is greater than the voltage applied to the pixel electrode of the second pixel PX2, and the voltage applied to the pixel electrode of the second pixel PX2 is greater than the voltage applied to the pixel electrode of the first pixel PX1.

Accordingly, the first pixel PX1 of the liquid crystal panel LP emits the first light L1 having the first wavelength that is transmitted at the maximum transmittance, the second pixel PX2 emits the second light L2 having the second wavelength that is transmitted at the maximum transmittance different from the maximum transmittance of the first light L1, and the third pixel PX3 emits the third light L3 having the third wavelength that is transmitted at the maximum transmittance different from the maximum transmittances of the first light L1 and the second light L2. The first light L1, the second light L2, and the third light L3 that are emitted by the first, the second, and the third pixels PX1, PX2, and PX3 of the liquid crystal panel LP, respectively, are transmitted at the different maximum transmittances, and overall luminance of the image displayed by the liquid crystal panel LP is improved. This may act as a factor for improving overall display quality of the image displayed by the liquid crystal panel LP.

Since the first light L1, the second light L2, and the third light L3 that are respectively emitted by the first, second, and third pixels PX1, PX2, and PX3 respectively have the maximum transmittances that are different from each other, the backlight unit BL to be described below is provided to suppress the image displayed by the liquid crystal panel LP from being recognized as a red image that is represented by the third wavelength of the third light L3 having the highest maximum transmittance among the first light L1, the second light L2, and the third light L3.

Figure 3:
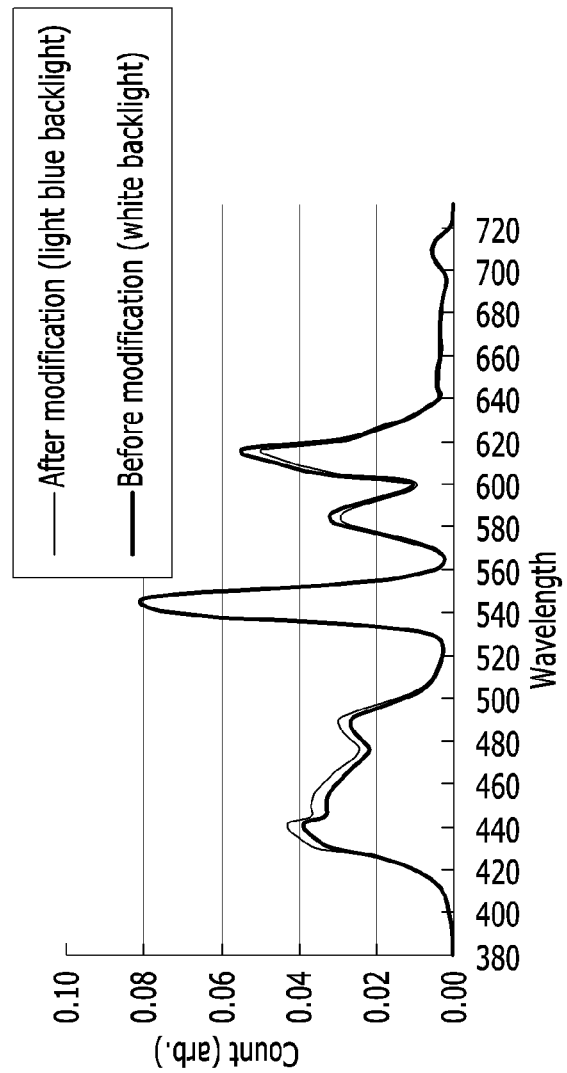
FIG. 3 is a graph showing intensity of backlight emitted by a backlight unit according to each wavelength in the LCD of FIG. 1 according to an exemplary embodiment.

FIG. 3 is a graph showing intensity of backlight emitted by the backlight unit according to each wavelength in the LCD of FIG. 1 according to an exemplary embodiment. An X-axis of FIG. 3 represents a wavelength of the backlight emitted by the backlight unit BL of FIG. 1, and a Y-axis represents intensity of the backlight BL. In FIG. 3, a thick solid line (before modification) represents intensity of a white backlight ("backlight representing white color") emitted by a conventional backlight unit, and a thin solid line (after modification) represents intensity of the backlight emitted by the backlight unit according to an exemplary embodiment.

As shown in FIG. 1 and FIG. 3, the backlight unit BL emits the backlight to the liquid crystal panel LP. In this case, the backlight emitted by the backlight unit BL is recognized as light having the first wavelength. That is, the backlight emitted from the backlight unit BL may be light representing light blue color.

Specifically, in the backlight emitted by the backlight unit BL included in the LCD according to an exemplary embodiment, overall intensity of the first wavelength is relatively higher than the intensity of the first wavelength in a white backlight, while overall intensity of the third wavelength is relatively lower than the intensity of the third wavelength in a white backlight. In this case, the overall intensity may be an integral value of the graph illustrated in FIG. 3, but it is not limited thereto.

Intensities of the entire wavelengths of the backlight of the conventional backlight unit illustrated in FIG. 3 [thick solid line (before modification)] is adjusted to be simply recognized as white light, but the backlight of the backlight unit according to the exemplary embodiment [thin solid line (after modification)] is recognized as blue light having the first wavelength since the overall intensity of the first wavelength is higher than those of the other wavelengths and the overall intensity of the third wavelength is lower than those of the other wavelengths, such that the image displayed by the liquid crystal panel LP can be suppressed from being recognized as a red image that is represented by the third wavelength included in the third light L3 having the highest maximum transmittance, among the first light L1, the second light L2, and the third light L3.

As such, the first light L1, the second light L2, and the third light L3 that are respectively emitted from the first, second, and third pixels PX1, PX2, and PX3 of the liquid crystal panel LP may be transmitted at the maximum transmittances that are different from each other, and overall luminance of the image displayed by the liquid crystal panel LP can be improved, and simultaneously, color shift that may be generated by the different maximum transmittances can be corrected by the calibrated backlight of the backlight unit BL in which the entire wavelengths are corrected, so luminance of the image displayed by the LCD can be improved and thus overall display quality can be improved.

Accordingly, the LCD in which overall luminance is improved to improve display quality can be provided.

Figure 4:
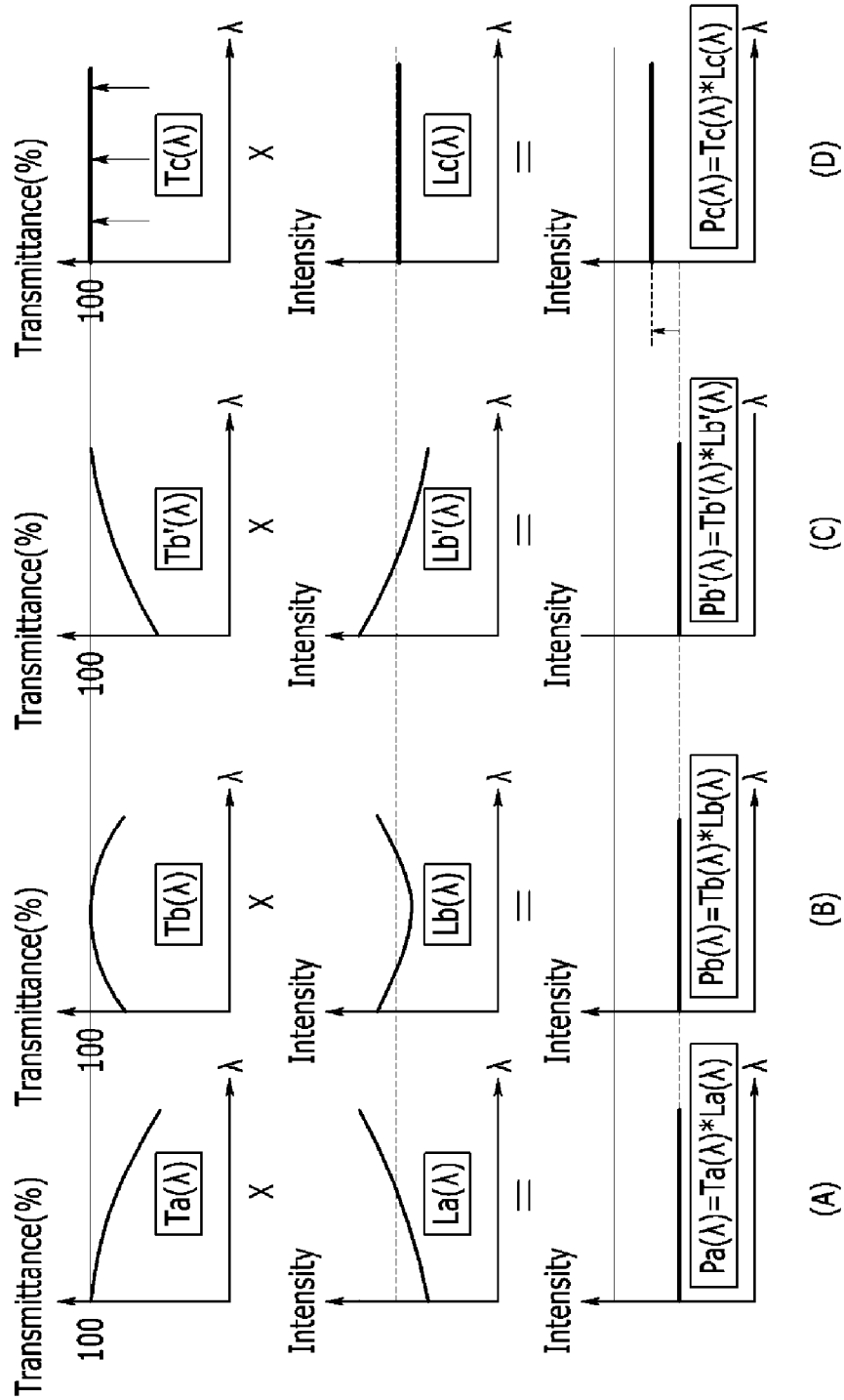
FIG. 4 is a graph that illustrates (A) Comparative Example 1, (B) Comparative Example 2, (C) Comparative Example 3, and (D) an effect of the LCD of FIG. 1 according to an exemplary embodiment.

With reference to FIG. 4, an effect of the LCD according to the exemplary embodiment will be described.

FIG. 4 is a graph that illustrates (A) Comparative Example 1, (B) Comparative Example 2, (C) Comparative Example 3, and (D) an effect of the LCD of FIG. 1 according to an exemplary embodiment.

Referring to part (A) of FIG. 4, an LC panel of an LCD according to Comparative Example 1 has transmittance according to the first wavelength [$Ta(\lambda)$], backlight of a backlight unit has intensity according to the first wavelength [$La(\lambda)$] that compensates for the transmittance according to the first wavelength, and as a result, an image displayed by the LCD has display intensity according to the first wavelength [Pa(λ)].

Referring to part (B) of FIG. 4, an LC panel of an LCD according to Comparative Example 2 has transmittance [Tb(λ)] according to the second wavelength, backlight of a backlight unit has intensity according to the second wavelength [Lb(λ)] that compensates for the transmittance according to the second wavelength, and as a result, an image displayed by the LCD has display intensity according to the second wavelength [Pb(λ)].

Referring to part (C) of FIG. 4, an LC panel of an LCD according to Comparative Example 3 has transmittance according to the third wavelength [Tb'(λ)], backlight of the backlight unit has intensity according to the third wavelength [Lb'(λ)] to compensate for the transmittance according to the third wavelength, and accordingly, an image displayed by the LCD has display intensity according to the third wavelength [Pb'(λ)].

As such, in Comparative Examples 1, 2, and 3, the LC panels have different transmittances according to each wavelength and the backlight of each backlight unit has different intensity according to each wavelength to compensate for the transmittance, and since the backlight unit simply compensates for the intensity according to each wavelength while the LC panels have the different transmittances according to each wavelength, the image displayed by the LCD only has the display intensity according to the first wavelength [Pa(λ)], the display intensity according to the second wavelength [Pb(λ)], and the display intensity according to the third wavelength [Pb'(λ)], which are substantially identical to each other.

Referring to part (D) of FIG. 4, since the LC panel of the LCD according to the exemplary embodiment has maximum transmittance [Tc(λ)] according to each wavelength and the backlight of the backlight unit has maximum intensity according to each wavelength [Lc(λ)], the image displayed by the LCD has higher intensity than Comparative Examples 1, 2, and 3 in terms of maximum display intensity according to each wavelength. Accordingly, an LCD with improved overall display quality according to the exemplary embodiment can be provided.

Figure 5:
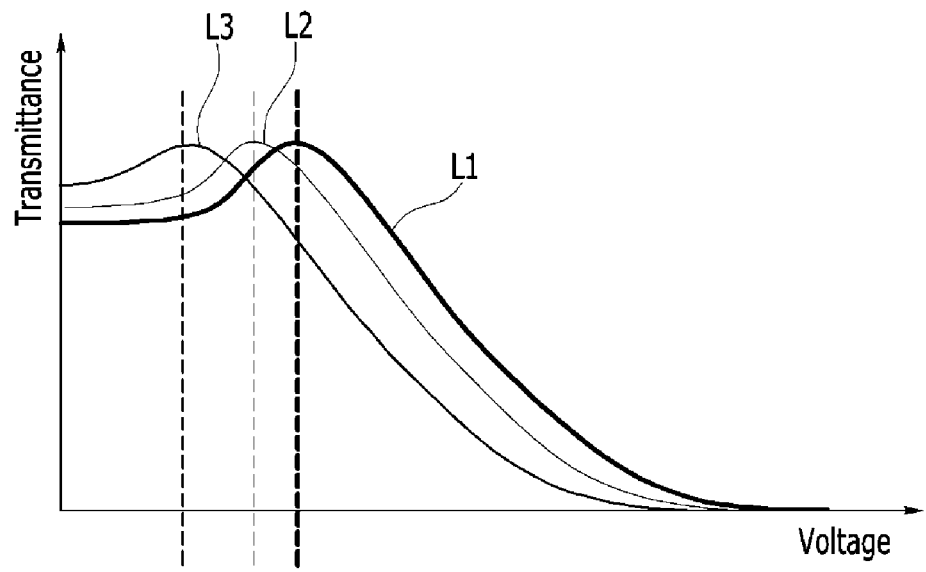
FIG. 5 is a graph showing transmittances of light according to each wavelength transmitted through the LC panel in an LCD according to an exemplary embodiment.

With reference to FIG. 5, an LCD according to another exemplary embodiment will be described.

FIG. 5 is a graph showing transmittances of light according to each wavelength transmitted through the LC panel in an LCD according to another exemplary embodiment.

As shown in FIG. 5, in the LCD, due to a phase delay characteristic of an LC layer included in a liquid crystal panel LP, first light L1 emitted by a first pixel PX1, second light L2 emitted by a second pixel PX2, and third light L3 emitted by a third pixel PX3, which are transmitted through the liquid crystal panel LP, have maximum transmittances that are different from each other, and the maximum transmittances of the first light L1, the second light L2, and the third light L3 for the liquid crystal panel LP are realized by different voltages that are applied to a pixel electrode of each pixel.

Since the liquid crystal panel LP has different maximum transmittances for each of the first light L1, the second light L2, and the third light L3, the different voltages may be applied to each of the pixel electrodes of the first, second, and third pixels PX1, PX2, and PX3 such that each of the first light L1, the second light L2, and the third light L3 may be respectively emitted at their maximum transmittances.

In order for the first light L1, the second light L2, and the third light L3 to be respectively transmitted through the liquid crystal panel LP at their maximum transmittances, the voltage applied to the pixel electrode of the first pixel PX1 may be higher than the voltage applied to the pixel electrode of the second pixel PX2, and the voltage applied to the pixel electrode of the second pixel PX2 may be higher than the voltage applied to the pixel electrode of the third pixel PX3.

Accordingly, the first pixel PX1 of the liquid crystal panel LP emits the first light L1 having the first wavelength that is transmitted at the maximum transmittance, the second pixel PX2 emits the second light L2 having the second wavelength to be transmitted at the maximum transmittance that is different from the first light L1, and the third pixel PX3 emits the third light L3 having the third wavelength to be transmitted at the maximum transmittance that is different from the first light L1 and the second light L2. More specifically, the first light L1, the second light L2, and the third light L3 that are emitted by the first, second, and third pixels PX1, PX2, and PX3 of the liquid crystal panel LP are respectively transmitted at the different maximum transmittances, thereby improving overall luminance of the image displayed by the liquid crystal panel LP. This configuration serves as a factor for improving overall display quality of the image displayed by the liquid crystal panel LP.

According to an exemplary embodiment, a liquid crystal display (LCD) includes a first pixel configured to emit first light having a first wavelength, a second pixel configured to emit second light having a second wavelength longer than the first wavelength, a third pixel configured to emit third light having a third wavelength longer than the second wavelength, a liquid crystal (LC) panel in which maximum transmittances for the first light, the second light, and the third light are different from each other, and a backlight unit configured to provide backlight to the LC panel. Intensity of the first wavelength of the backlight provided by the backlight unit is different from intensity of the first wavelength in a white backlight. For example, the intensity of the first wavelength of the backlight provided by the backlight unit may be higher or lower than the intensity of the first wavelength in a white backlight according to a difference between at least two values of the maximum transmittances.

As shown in FIG. 3, if the intensity of the first wavelength of the backlight provided by the backlight unit is higher than the intensity of the first wavelength in a white backlight, the backlight provided by the backlight unit exhibits light blue color. Further, intensity of the third wavelength of the backlight provided by the backlight unit may be lower than intensity of the third wavelength in a white backlight as illustrated in FIG. 3.

As shown in FIG. 2, driving voltages for the maximum transmittances for the first light, the second light, and the third light may be different from each other. Referring to FIG. 2, the LCD may be configured to apply different voltages to pixel electrodes of the first pixel, the second pixel, and the third pixel such that the different voltages drive the first pixel, the second pixel, and the third pixel at the respective maximum transmittances. As shown in FIG. 2, FIG. 3, and FIG. 4, a difference between the intensity of the first wavelength of the backlight provided by the backlight unit and the intensity of the first wavelength in a white backlight is associated with a difference between the maximum transmittances for at least two of the first light, the second light, and the third light.

For example, based on a difference between the maximum transmittances for the first light and the third light, a difference between the intensity of the first wavelength of the backlight provided by the backlight unit and the intensity of the first wavelength in a white backlight and a difference between the intensity of the third wavelength of the backlight provided by the backlight unit and the intensity of the third wavelength in a white backlight may be determined. While maintaining the second wavelength shorter than the third wavelength and the first wavelength shorter than the second wavelength, the first wavelength may include at least one wavelength in a range of about 400 nm to about 530 nm, the second wavelength may include at least one wavelength in a range of about 520 nm to about 570 nm, and the third wavelength may include at least one wavelength in a range of about 560 nm to about 640 nm.

According to one or more exemplary embodiments, since light transmitted through the LC layer according to each wavelength is transmitted at maximum transmittance, the LCD with improved overall luminance of the displayed image can be provided.

The LCD may include a voltage generator, e.g., a gray voltage generator, (not shown), a gate driver, and a data driver (not shown). The gate driver may provide a gate signal (or scan signal) to a gate electrode of a thin-film transistor. The data driver may provide a data signal to a source electrode of the thin-film transistor based on a control of the voltage generator so that a drain electrode of the thin-film transistor connected to a pixel electrode can be driven by a data voltage. The voltage generator and the data driver may be configured to apply different voltages to a red pixel, a green pixel, and a blue pixel such that each of the red pixel, the green pixel, and the blue pixel emits light at the respective maximum transmittances. The voltage generator may have different gray voltage scales for the red pixel, the green pixel, and the blue pixel based on the differences between the maximum transmittances for the red pixel, the green pixel, and the blue pixel, thereby increasing the overall transmittance.

The backlight unit BL may have a structure to generate corrected backlight. For example, the backlight unit BL may receive white light as an input light source and may change intensity of some wavelengths of the received white light by amplifying, filtering and the like. Further, the backlight unit BL may be configured to generate red light, green light, and blue light, and may control the intensities of the red light, the green light, and the blue light, respectively. Although this disclosure illustrates the combination of red, green, blue colors, aspects of exemplary embodiments are not limited thereto. For example, various color combination may be possible based on white, red, green, blue, magenta, cyan, and the like.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A liquid crystal display (LCD) comprising:
   a first pixel configured to emit first light having a first wavelength;
   a second pixel configured to emit second light having a second wavelength longer than the first wavelength;
   a third pixel configured to emit third light having a third wavelength longer than the second wavelength;
   a liquid crystal (LC) panel in which driving voltages for maximum transmittances for the first light, the second light, and the third light are different from each other; and
   a backlight unit configured to emit backlight to the LC panel,
   wherein the LCD is configured to apply different voltages to pixel electrodes of the first pixel, the second pixel, and the third pixel, respectively, such that the first light, the second light, and the third light respectively emitted by the first pixel, the second pixel, and the third pixel are transmitted at the respective maximum transmittances,
   wherein, in the LC panel, the maximum transmittance for the third light is higher than the maximum transmittance for the second light and the maximum transmittance for the first light, and
   wherein the first wavelength of the backlight of the backlight unit has the highest intensity.

2. The LCD of claim 1, wherein in the LC panel, the maximum transmittance for the second light is higher than the maximum transmittance for the first light.

3. The LCD of claim 1, wherein the backlight of the backlight unit is recognized as light representing a color corresponding to the first wavelength.

4. The LCD of claim 1, wherein the third wavelength of the backlight of the backlight unit has the lowest intensity.

5. The LCD of claim 1, wherein the first light exhibits blue color, the second light exhibits green color, and the third light exhibits red color.

6. A liquid crystal display (LCD) comprising:
   a first pixel configured to emit first light having a first wavelength;
   a second pixel configured to emit second light having a second wavelength longer than the first wavelength;
   a third pixel configured to emit third light having a third wavelength longer than the second wavelength; and
   a liquid crystal (LC) panel in which driving voltages for maximum transmittances for the first light, the second light, and the third light are different from each other,
   wherein the LCD is configured to apply different voltages to pixel electrodes of the first pixel, the second pixel, and the third pixel, respectively, such that the first light, the second light, and the third light respectively emitted by the first pixel, the second pixel, and the third pixel are transmitted at the respective maximum transmittances,
   wherein, in the LC panel, the maximum transmittance for the third light is higher than the maximum transmittance for the second light and the maximum transmittance for the first light, and
   wherein a voltage applied to the pixel electrode of the third pixel is higher than a voltage applied to the pixel electrode of the second pixel, and the voltage applied to the pixel electrode of the second pixel is higher than a voltage applied to the pixel electrode of the first pixel.

7. The LCD of claim 1, wherein a voltage applied to the pixel electrode of the first pixel is higher than a voltage applied to the pixel electrode of the second pixel, and the voltage applied to the pixel electrode of the second pixel is higher than a voltage applied to the pixel electrode of the third pixel.

8. A liquid crystal display (LCD) comprising:
   a first pixel configured to emit first light having a first wavelength;
   a second pixel configured to emit second light having a second wavelength longer than the first wavelength;
   a third pixel configured to emit third light having a third wavelength longer than the second wavelength;

a liquid crystal (LC) panel in which maximum transmittances for the first light, the second light, and the third light are different from each other; and a backlight unit configured to provide backlight to the LC panel, wherein a light with the greatest maximum transmittances among the first light, the second light, and the third light has the lowest intensity of the wavelength of the backlight provided by the backlight unit, and a light with the smallest maximum transmittances has the highest intensity of the wavelength of the backlight provided by the backlight unit.

9. The LCD of claim 8, wherein the backlight provided by the backlight unit exhibits light blue color.

10. The LCD of claim 8, wherein driving voltages for the maximum transmittances for the first light, the second light, and the third light are different from each other.

11. The LCD of claim 10, wherein the LCD is configured to apply different voltages to pixel electrodes of the first pixel, the second pixel, and the third pixel such that the different voltages drive the first pixel, the second pixel, and the third pixel at the respective maximum transmittances.

12. The LCD of claim 8, wherein the first wavelength comprises at least one wavelength in a range of about 400 nm to about 530 nm, the second wavelength comprises at least one wavelength in a range of about 520 nm to about 570 nm, and the third wavelength comprises at least one wavelength in a range of about 560 nm to about 640 nm.

13. The LCD of claim 8, wherein the first light exhibits blue color, the second light exhibits green color, and the third light exhibits red color.

* * * * *